US011273407B2

(12) United States Patent
Hirata et al.

(10) Patent No.: US 11,273,407 B2
(45) Date of Patent: Mar. 15, 2022

(54) ACID GAS REMOVAL DEVICE AND ACID GAS REMOVAL METHOD

(71) Applicant: Mitsubishi Heavy Industries Engineering, Ltd., Kanagawa (JP)

(72) Inventors: Takuya Hirata, Tokyo (JP); Hiroshi Tanaka, Tokyo (JP); Kaori Yoshida, Tokyo (JP); Takahiko Endo, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 265 days.

(21) Appl. No.: 16/635,771

(22) PCT Filed: Oct. 24, 2018

(86) PCT No.: PCT/JP2018/039520
§ 371 (c)(1),
(2) Date: Jan. 31, 2020

(87) PCT Pub. No.: WO2019/087900
PCT Pub. Date: May 9, 2019

(65) Prior Publication Data
US 2021/0113955 A1    Apr. 22, 2021

(30) Foreign Application Priority Data

Oct. 31, 2017  (JP) .............................. JP2017-210569

(51) Int. Cl.
*B01D 53/14*     (2006.01)
*B01D 53/18*     (2006.01)
*B01D 53/26*     (2006.01)

(52) U.S. Cl.
CPC ..... *B01D 53/1425* (2013.01); *B01D 53/1475* (2013.01); *B01D 53/18* (2013.01); *B01D 53/265* (2013.01); *B01D 2252/204* (2013.01)

(58) Field of Classification Search
CPC ............ B01D 53/1462; B01D 53/1475; B01D 53/526; B01D 53/62; B01D 53/58;
(Continued)

(56) References Cited

U.S. PATENT DOCUMENTS 3,101,996 A    8/1963   Bresler et al.
4,160,810 A    7/1979   Benson et al.
(Continued)

FOREIGN PATENT DOCUMENTS

CA    1149583 A    7/1983
EP    2253586 A1   11/2010
(Continued)

OTHER PUBLICATIONS

Extended European Search Report issued in corresponding European Patent Application No. 18874215.9, dated Mar. 17, 2021 (12 pages).
(Continued)

*Primary Examiner* — Timothy C Vanoy
(74) *Attorney, Agent, or Firm* — Osha Bergman Watanabe & Burton LLP

(57) ABSTRACT

An acid gas regenerator includes a regenerator condenser that condenses moisture from entraining gas entraining a corrosive substance and acid gas discharged from a column top portion of a regenerator that regenerates acid gas absorbent. The regenerator condenser includes: a gas discharge line that discharges the entraining gas from the column top portion of the regenerator, a cooler installed on the discharge line; a gas-liquid separator that separates $CO_2$ gas from regenerator condensed water obtained by condensing vapor using the cooler, a reflux line that refluxes the regenerator condensed water closer to the column top portion than the rich solution introducing unit; a condensed water receiver storing the condensed water introduced by the reflux line;
(Continued)

and a first condensed water extraction line that extracts the condensed water from a condensed water extractor of the condensed water receiver and is connected to a lean solution supply line.

9 Claims, 6 Drawing Sheets

(58) Field of Classification Search
CPC ............. B01D 53/78; B01D 2257/304; B01D 2257/406; B01D 2257/504; B01D 2258/0283
See application file for complete search history.

(56) References Cited

U.S. PATENT DOCUMENTS

| | | | |
|---|---|---|---|
| 4,452,763 | A | 6/1984 | van de Kraats et al. |
| 6,036,931 | A | 3/2000 | Yoshida et al. |
| 8,007,570 | B2 * | 8/2011 | Sonwane ........... B01D 53/1475 95/183 |
| 9,421,491 | B2 * | 8/2016 | Tsujiuchi ............... B01D 53/62 |
| 10,981,105 | B2 * | 4/2021 | Shibata .............. B01D 53/1425 |
| 2003/0045756 | A1 | 3/2003 | Mimura et al. |
| 2004/0092774 | A1 | 5/2004 | Mimura et al. |
| 2015/0030516 | A1 | 1/2015 | Higashi et al. |
| 2015/0361364 | A1 | 12/2015 | Horizoe et al. |

FOREIGN PATENT DOCUMENTS

| | | |
|---|---|---|
| EP | 2823876 A1 | 1/2015 |
| EP | 3178537 A1 | 6/2017 |
| FR | 2573672 A1 | 5/1986 |
| GB | 2167738 A | 6/1986 |
| JP | S54-155172 A | 12/1979 |
| JP | S55-92123 A | 7/1980 |
| JP | S61-136422 A | 6/1986 |
| JP | H05-301023 A | 11/1993 |
| JP | 2002-126439 A | 5/2002 |
| JP | 2011-177685 A | 9/2011 |
| JP | 2013-180281 A | 9/2013 |
| JP | 2014-161758 A | 9/2014 |
| WO | 0234369 A1 | 5/2002 |

OTHER PUBLICATIONS

Written Opinion of the International Search Report in corresponding International Application No. PCT/JP2018/039520, dated Nov. 27, 2018 (24 pages).
International Search Report in corresponding International Application No. PCT/JP2018/039520, dated Nov. 27, 2018 (5 pages).
Office Action in corresponding Indian Application No. 202017004248, dated May 29, 2020 (5 pages).

* cited by examiner

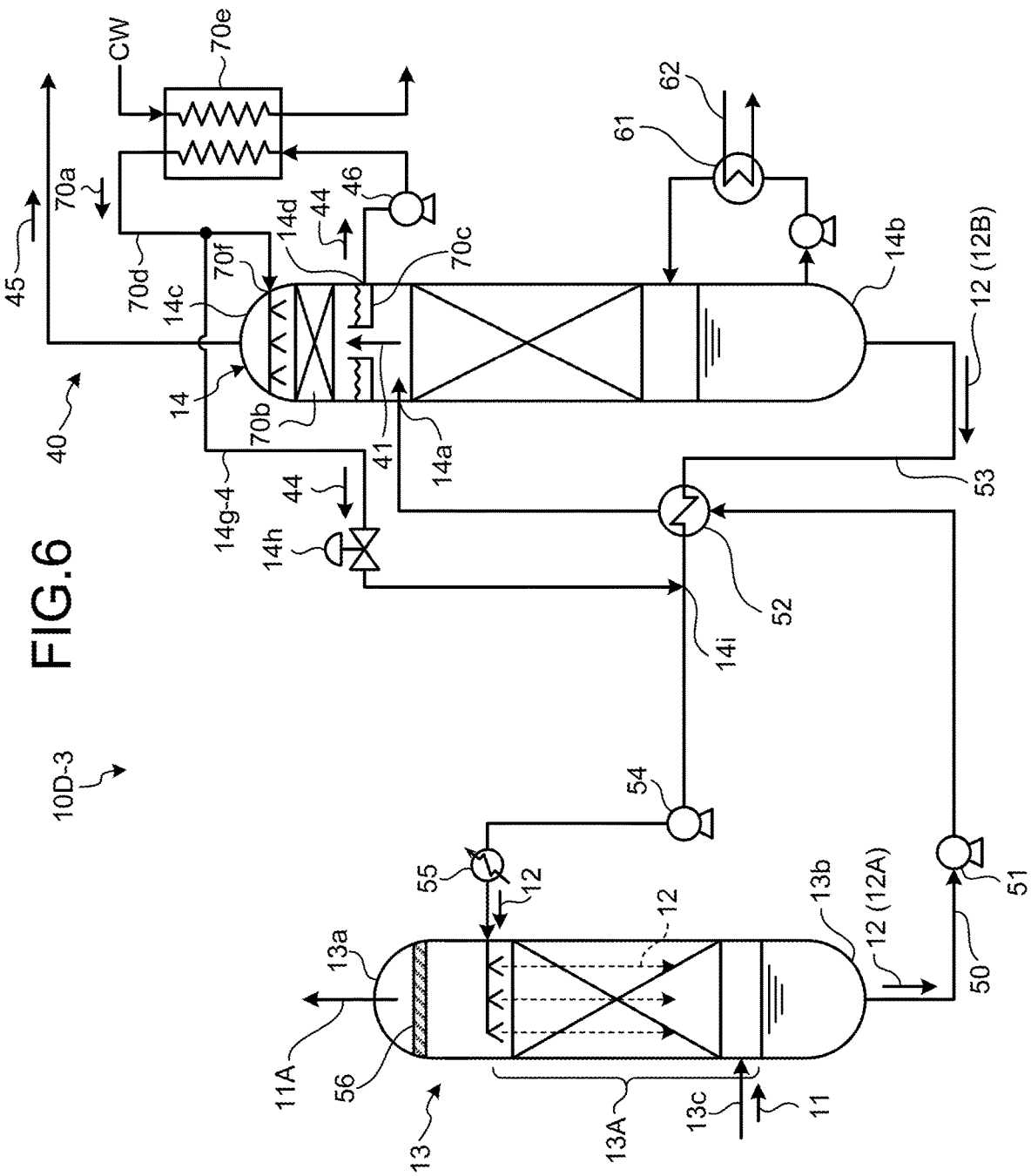

ACID GAS REMOVAL DEVICE AND ACID GAS REMOVAL METHOD

FIELD

The present invention relates to an acid gas removal device and an acid gas removal method that remove acid gas contained in gas.

BACKGROUND

For example, as a technique for removing acid gas such as $CO_2$, $H_2S$, and $H_2S$ contained in gasified gas obtained by gasifying coal, biomass, or the like in a gasification furnace, a chemical absorption technique using amine-based absorbent or the like is conventionally used. As the chemical absorption technique, a technique for an acid gas removal device, which uses an amine absorption component as absorbent, causes $CO_2$ in gas to be absorbed to generate rich solution in an absorber, introduces the rich solution containing the absorbed $CO_2$ into a regenerator, releases the $CO_2$ from the rich solution with a heat source such as a reboiler to generate lean solution that is the absorbent from which the $CO_2$ is removed, reintroduces the lean solution into the absorber to circulate and reuse the lean solution, has been proposed (refer to, for example, Patent Literature 1).

There is a problem that, when a corrosive substance such as $NH_3$, $H_2S$, or $HCN$ is contained in gas, a component absorbed in the absorbent in the absorber, for example, $NH_3$, $H_2S$, $HCN$, or the like is accumulated in condensed water generated upon the cooling of output gas discharged from the regenerator, and thus this impurity causes the corrosion of a device material such as a column top condenser exposed to the condensed water containing this impurity.

Rich solution that has absorbed, for example, $NH_3$ together with $CO_2$ in the absorber is supplied to the regenerator. The rich solution supplied to the regenerator is heated to release the $CO_2$ and the $NH_3$. The released $NH_3$ contained in regenerator output gas is absorbed again into the condensed water generated due to the cooling of a cooling device at a column top portion of the regenerator. As a result, there is a problem that, when the condensed water is introduced into the regenerator, a cycle in which the rich solution containing the $NH_3$ flows downward and the $NH_3$ is released from the liquid falling in the regenerator is repeated.

In addition to the foregoing cycle, $NH_3$ in untreated gas continuously introduced is newly absorbed into, for example, the lean solution from which the $NH_3$ has been released in the absorber. Thus, there is a problem that $NH_3$ is continuously supplied into the regenerator from the rich solution and is accumulated and concentrated in the condensed water in the regenerator.

As a countermeasure against the corrosion, various measures are conducted. The various measures include: 1) a method of purging the condensed water; 2) a pretreatment removal method of removing $NH_3$ by water washing or the like at an upstream portion of the absorber; 3) a method of adding a corrosion inhibitor to condensed moisture contained in regenerator upstream gas or regenerator output gas; 4) a stripping process method of stripping $NH_3$ from the condensed water; and 5) a method using a corrosion-resistant material.

CITATION LIST

Patent Literature

Patent Literature 1: Japanese Laid-open Patent Publication No. 2014-161758

SUMMARY

Technical Problem

However, the method of purging the condensed water containing $NH_3$ has a problem that an absorbent component such as amine is also contained in the condensed water, which increases costs of the absorbent. Further, the method has a problem that discharge water containing a toxic substance such as amine should be treated appropriately, which requires costs of measures for the treatment.

There is a problem that removing $NH_3$ at the upstream portion (pre-stage) of the absorber and stripping the $NH_3$ from the condensed water require installation of an additional facility and thus increase facility costs.

There is a problem that measures using the corrosion inhibitor also require costs of the inhibitor.

While the evaporation and condensation of the $NH_3$ introduced by the rich solution are repeated in the regenerator, the $NH_3$ is accumulated in the regenerator. Thus, there is a problem that an input heat quantity required to evaporate the $NH_3$ concentrated in the condensed water increases.

In view of the foregoing problems, the present invention aims to provide an acid gas removal device and an acid gas removal method that can reduce a corrosive substance in condensed water in a regenerator when the corrosive substance such as $NH_3$, $H_2S$, and $HCN$ is contained in gas.

Solution to Problem

According to a first aspect of the present invention to solve the foregoing problems, an acid gas removal device includes: an acid gas absorber including an acid gas absorbing unit that brings acid gas contained in gas containing a corrosive substance and the acid gas into contact with acid gas absorbent to remove the acid gas; an absorbent regenerator that regenerates, using vapor from a reboiler, rich solution having absorbed the acid gas; a rich solution supply line that extracts the rich solution from the acid gas absorber, and that introduces the rich solution into a rich solution introducing unit installed on a column top portion side of the absorbent regenerator; a lean solution supply line that extracts, from a bottom portion of the absorbent regenerator, lean solution having been regenerated by releasing the acid gas in the absorbent regenerator, that introduces the lean solution into the acid gas absorber, and that reuses the lean solution as the acid gas absorbent; a rich/lean solution heat exchanger installed at an intersection of the rich solution supply line and the lean solution supply line; and a regenerator condenser that condenses moisture from entraining gas entraining the corrosive substance and the acid gas and discharged from the column top portion of the regenerator. The regenerator condenser includes: a gas discharge line that discharges the entraining gas from the column top portion of the regenerator; a cooler interposed in the gas discharge line; a gas-liquid separator that separates the acid gas from regenerator condensed water obtained by condensing vapor using the cooler; a reflux line that refluxes the regenerator condensed water to a condensed water introducing unit installed closer to the column top portion than the rich solution introducing unit; a condensed water receiver that stores the regenerator condensed water introduced by the reflux line; and a first condensed water extraction line that extracts the regenerator condensed water from a condensed water extractor of the condensed water receiver, and that is connected to the lean solution supply line.

According to a second aspect, the acid gas removal device according to the first aspect further includes a second condensed water extraction line that extracts part of the regenerator condensed water before the regenerator condensed water is introduced to the condensed water introducing unit, instead of the extraction of the regenerator condensed water by the first condensed water extraction line, and that is connected to the lean solution supply line.

According to a third aspect, in the acid gas removal device according to the first aspect or the second aspect, the acid gas absorber includes a cleaning unit that is installed downstream of the acid gas absorbing unit in a gas flow direction, and that cleans the gas, from which the acid gas has been removed, using circulating wash water, and part of or all the regenerator condensed water merges with the wash water.

According to a fourth aspect, an acid gas removal device includes: an acid gas absorber including an acid gas absorbing unit that brings acid gas contained in gas containing a corrosive substance and the acid gas into contact with acid gas absorbent to remove the acid gas; an absorbent regenerator that regenerates, using vapor from a reboiler, rich solution having absorbed the acid gas; a rich solution supply line that extracts the rich solution from the acid gas absorber, and that introduces the rich solution into a rich solution introducing unit installed on a top portion side of the absorbent regenerator; a lean solution supply line that extracts, from a bottom portion of the absorbent regenerator, lean solution that has been regenerated by releasing the acid gas in the absorbent regenerator, and that introduces the lean solution into the acid gas absorber and reuses the lean solution as the acid gas absorbent; a rich/lean solution heat exchanger installed at an intersection of the rich solution supply line and the lean solution supply line; and a regenerator condenser that condenses moisture from entraining gas entraining the corrosive substance and the acid gas and discharged from a column top portion of the regenerator. The regenerator condenser includes: a concentrating unit that is installed closer to the column top portion than the rich solution introducing unit of the regenerator, that cools the entraining gas using cooling water in the regenerator, and that performs gas-liquid separation to separate regenerator condensed water from the acid gas; a condensed water receiver that stores the regenerator condensed water; a circulation line that extracts the regenerator condensed water from the condensed water receiver, and that causes the regenerator condensed water to circulate to the top portion side of the regenerator using a reflux water circulation pump; a cooler that is interposed in the circulation line, and that cools the regenerator condensed water to make cooling water; and a third condensed water extraction line that extracts the regenerator condensed water from a condensed water extractor of the condensed water receiver or from a section between the cooler of the circulation line and the reflux water circulation pump, and that is connected to the lean solution supply line.

According to a fifth aspect, the acid gas removal device according to the fourth aspect further includes a fourth condensed water extraction line that extracts part of the cooling water, instead of the extraction of the regenerator condensed water by the third condensed water extraction line, and that is connected to the lean solution supply line.

According to a sixth aspect, an acid gas removal method includes: an acid gas absorption process of introducing gas containing a corrosive substance and acid gas into an acid gas absorber and bringing the acid gas contained in the gas into contact with acid gas absorbent to remove the acid gas; an absorbent regeneration process of introducing rich solution having absorbed the acid gas into an absorbent regenerator and regenerating the acid gas using vapor from a reboiler; a process of circulating and reusing the acid gas absorbent using a circulation line between the acid gas absorber and the absorbent regenerator; a regenerator condensation process of condensing moisture from entraining gas entraining the corrosive substance and the acid gas that have been separated, the regenerator condensation process being performed outside the absorbent regenerator at the absorbent regeneration process; a process of separating the acid gas from regenerator condensed water obtained by cooling the entraining gas to condense vapor; a reflux process of refluxing and storing the regenerator condensed water at a position closer to a column top portion than a position where the rich solution is introduced into the absorbent regenerator; and a merger process of extracting the refluxed regenerator condensed water and merging the lean solution circulating to the acid gas absorber and the regenerator condensed water containing the corrosive substance.

According to a seventh aspect, an acid gas removal method includes: an acid gas absorption process of introducing gas containing a corrosive substance and acid gas into an acid gas absorber and bringing the acid gas contained in the gas into contact with acid gas absorbent to remove the acid gas; an absorbent regeneration process of introducing rich solution having absorbed the acid gas into an absorbent regenerator and regenerating the acid gas using vapor from a reboiler; a process of circulating and reusing the acid gas absorbent using a circulation line between the acid gas absorber and the absorbent regenerator; a regenerator condensation process of condensing moisture from entraining gas entraining the corrosive substance with vapor and the acid gas at a position closer to a column top portion than a position where the rich solution is introduced into the regenerator at the absorbent regeneration process; a process of separating the acid gas from regenerator condensed water obtained by cooling the entraining gas to condense vapor from regenerator; a reflux process of extracting the regenerator condensed water to drain the regenerator condensed water to the outside, cooling the regenerator condensed water to make cooling water, and refluxing the regenerator condensed water from the column top portion side of the regenerator; and a process of extracting the regenerator condensed water and merging the lean solution circulating to the absorber and the condensed water containing the corrosive substance.

According to an eighth aspect, the acid gas removal method according to the sixth aspect or the seventh aspect further includes a cleaning process of cleaning the gas from which the acid gas has been removed, using circulating wash water, the cleaning process being performed downstream of the acid gas absorbing unit in a gas flow direction by the acid gas absorber, and part of or all the regenerator condensed water merges with the wash water.

Advantageous Effects of Invention

According to the present invention, mixing lean solution to be supplied to an acid gas absorber with regenerator condensed water to increase the concentration of a corrosive substance in the lean solution can reduce the amount of a corrosive substance to be newly absorbed from untreated gas in the acid gas absorber, and reduce the amount of the corrosive substance in the untreated gas to be moved to the regenerator condensed water, thereby suppressing an increase in the concentration of the corrosive substance in the condensed water. As a result, it is possible to reduce the concentration of the corrosive substance in the regenerator condensed water and prevent the corrosion of a member used for a column top condenser of the regenerator.

BRIEF DESCRIPTION OF DRAWINGS

FIG. 6 is a schematic diagram of still another acid gas removal device according to the fourth embodiment.

DESCRIPTION OF EMBODIMENTS

The following describes preferred embodiments of the present invention in detail with reference to the accompanying drawings. The present invention is not limited by the embodiments. When there is a plurality of embodiments, a configuration obtained by combining the embodiments is included.

First Embodiment

Figure 1:
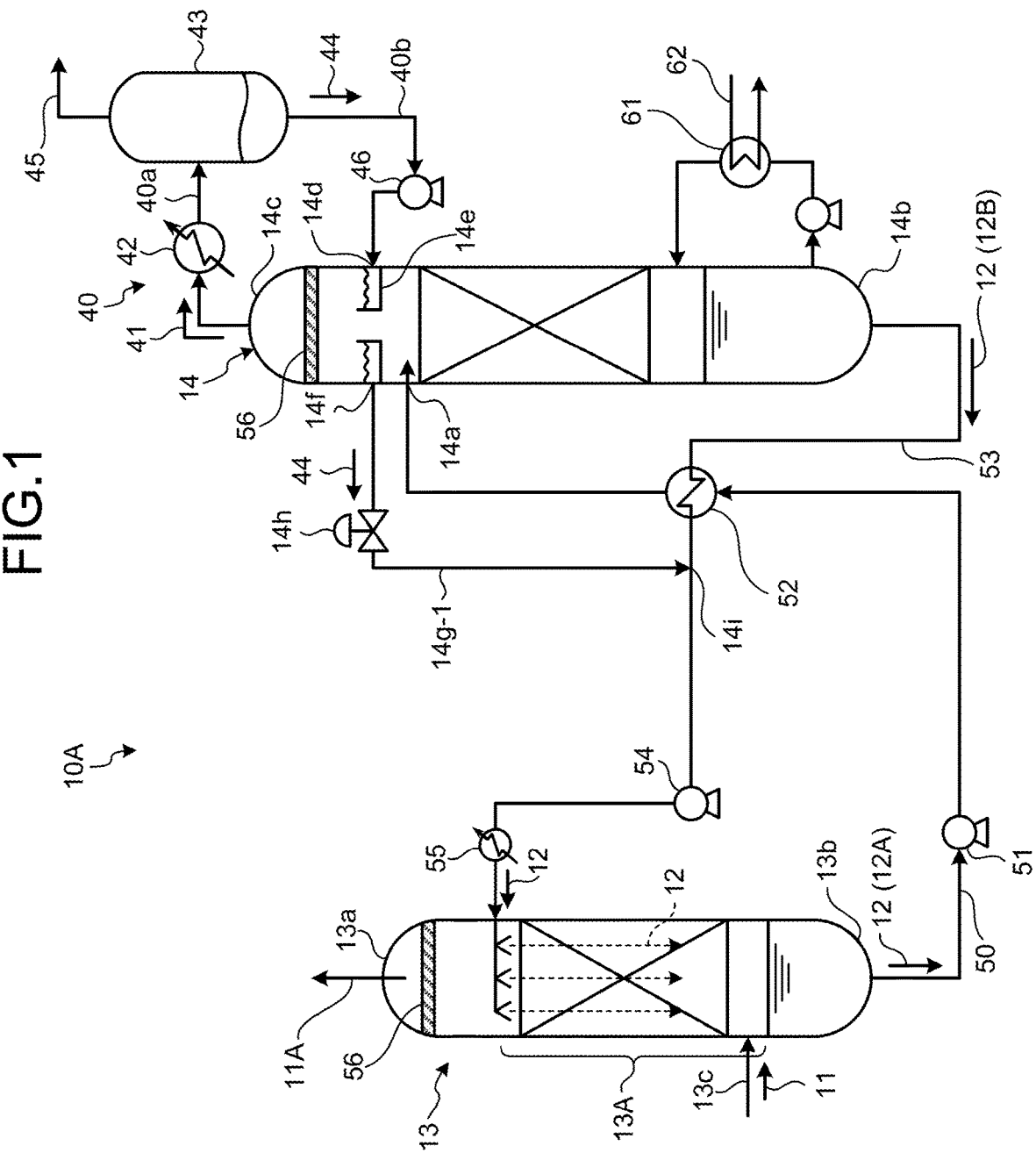
FIG. 1 is a schematic diagram of an acid gas removal device according to a first embodiment.

FIG. 1 is a schematic diagram of an acid gas removal device according to a first embodiment. The present embodiment described here is an embodiment in which carbon dioxide ($CO_2$) is an example of acid gas, $CO_2$ absorbent is used as absorbent that absorbs the $CO_2$, the $CO_2$ is removed from gas in a $CO_2$ absorber, and the $CO_2$ absorbent is regenerated by an absorbent regenerator. The acid gas removal device is also applicable to other acid gas such as $H_2S$ in the same manner.

As illustrated in FIG. 1, an acid gas removal device 10A according to the present embodiment includes: a $CO_2$ absorber (hereinafter referred to as "absorber") 13 including a $CO_2$ absorbing unit (hereinafter referred to as "absorbing unit") 13A into which introduction gas (hereinafter referred to as "gas") 11 containing $NH_3$ together with $CO_2$ is introduced and that brings the $CO_2$ contained in the gas into contact with $CO_2$ absorbent 12 to remove the $CO_2$; an absorbent regenerator (hereinafter referred to as "regenerator") 14 that regenerates the $CO_2$ absorbent 12 having absorbed the $CO_2$ as rich solution 12A by using vapor from a reboiler 61; a rich solution supply line 50 that extracts the rich solution 12A from the absorber 13 and introduces the rich solution 12A into the regenerator 14; and a lean solution supply line 53 that extracts, from the regenerator 14, lean solution 12B that is the $CO_2$ absorbent having been regenerated by releasing the $CO_2$ in the regenerator 14, and introduces the lean solution 12B into the absorber 13 to reuse the lean solution 12B as the $CO_2$ absorbent. The $CO_2$ absorbent 12 circulates and is reused as the rich solution 12A containing the $CO_2$ absorbed therein and the lean solution 12B from which the $CO_2$ has been released in the acid gas removed device.

In a $CO_2$ recovery method using the acid gas removal device 10A, first, the gas 11 containing the $NH_3$ and the $CO_2$ is cooled by cooling water in a cooler not illustrated and is delivered to the absorber 13.

In the absorber 13, the gas 11 introduced by a gas introduction line 13c is in countercurrent contact with the $CO_2$ absorbent 12 containing an amine $CO_2$ absorbing component, and the $CO_2$ contained in the gas 11 is absorbed into the $CO_2$ absorbent 12 by a chemical reaction. A $CO_2$-removed flue gas 11A from which the $CO_2$ has been removed in the absorber 13 is released from a top portion 13a to the outside of a system after mist is collected by a demister 56.

Further, the rich solution 12A containing the $CO_2$ absorbed therein is extracted by the rich solution supply line 50 from a bottom portion 13b of the absorber 13 and pressurized by a rich solution pump 51. Then, the rich solution 12A containing the $CO_2$ absorbed therein is heated by the lean solution 12B regenerated by the regenerator 14 in a rich/lean solution heat exchanger 52 installed at an intersection of the rich solution supply line 50 and the lean solution supply line 53 and is supplied to the regenerator 14.

The rich solution 12A released from a rich solution introducing unit 14a installed near an upper portion of the regenerator 14 to the inside reacts endothermically due to vapor from the reboiler 61 and supplied from a bottom portion and releases most of the $CO_2$. The $CO_2$ absorbent that has released part or most of the $CO_2$ in the regenerator 14 is referred to as semi-lean solution. When the semi-lean solution reaches a bottom portion 14b of the regenerator 14, the semi-lean solution becomes the $CO_2$ absorbent (lean solution) 12B from which almost all the $CO_2$ has been removed. Part of the lean solution 12B is heated by the reboiler 61 to which saturated vapor 62 has been supplied so that steam is supplied into the regenerator 14.

Gas (hereinafter referred to as "entraining gas") 41 entraining $CO_2$ and $NH_3$ with vapor released from the rich solution 12A and the semi-lean solution in the regenerator 14 is discharged from a column top portion 14c of the regenerator 14 after mist is collected by the demister 56.

Then, the vapor of the entraining gas 41 is condensed by a cooler 42, and regenerator condensed water (hereinafter referred to as "condensed water") 44 and $CO_2$ gas 45 are separated from each other by a gas-liquid separator 43. The separated $CO_2$ gas 45 is pressurized into an oil field using, for example, an enhanced oil recovery (EOR) technique or is stored in an aquifer for countermeasures against global warming.

Further, the regenerated $CO_2$ absorbent (lean solution) 12B is extracted by the lean solution supply line 53 from the bottom portion 14b of the regenerator 14 and cooled by the rich solution 12A in the rich/lean solution heat exchanger 52. Subsequently, the $CO_2$ absorbent (lean solution) 12B is pressurized by a lean solution pump 54, cooled by a lean solution cooler 55, and supplied into the absorber 13. The description of the acid gas removal device according to the present embodiment is directed to the outline of the acid gas removal device while partially omitting a description of ancillary equipment.

In the present embodiment, a regenerator condenser 40 that condenses moisture in the entraining gas 41 discharged from the column top portion 14c of the regenerator 14 is installed outside the regenerator 14.

The regenerator condenser 40 includes: a discharge line 40a that discharges the entraining gas 41 from the column top portion 14c of the regenerator 14; a cooler 42 interposed in the discharge line 40a; the gas-liquid separator 43 that separates the $CO_2$ gas 45 from the condensed water 44 obtained by condensing vapor using the cooler 42; a reflux line 40b that refluxes the condensed water 44 to a head portion of the regenerator 14; and a reflux water circulation pump 46 interposed in the reflux line 40b.

The $NH_3$ with vapor and the condensed water 44 separated from the entraining gas 41 and refluxed by the gas-liquid separator 43 are introduced by the reflux water circulation pump 46 from a condensed water introducing unit 14d installed closer to the column top portion 14c than the rich solution introducing unit 14a of the regenerator 14. A condensed water receiver 14e that receives condensed water is installed in the condensed water introducing unit 14d of the regenerator 14 and stores the condensed water 44 introduced therein.

In the present embodiment, a first condensed water extraction line 14g-1, which extracts the condensed water 44 from a condensed water extractor 14f of the condensed water receiver 14e of the regenerator 14 and is connected to the lean solution supply line 53, is installed. An on-off valve 14h is installed on the first condensed water extraction line 14g-1 to adjust an amount to be extracted.

The condensed water 44 containing the $NH_3$ and extracted from the first condensed water extraction line 14g-1 is mixed with the lean solution 12B extracted from the bottom portion 14b of the regenerator 14 at a merger portion 14i of the lean solution supply line 53 and is supplied to the absorber 13.

As a result, mixing the lean solution 12B to be supplied to the absorber 13 with the condensed water 44 to increase the $NH_3$ concentration of the corrosive substance in the lean solution can reduce the amount of $NH_3$ to be newly absorbed from untreated gas in the absorber 13, and reduce the amount of $NH_3$ in the untreated gas to be moved to the condensed water 44, thereby suppressing an increase in the concentration of $NH_3$ in the condensed water 44.

This can reduce the concentration of the $NH_3$, which is the corrosive substance in the condensed water 44, and to prevent the corrosion of a member used for the column top condenser of the regenerator 14.

Mixing the condensed water 44 with the lean solution 12B circulating and supplied to the absorber 13 without being discharged to the outside of the system can prevent a loss of an absorbent component such as amine and eliminate the need for performing additional treatment on condensed water containing a toxic absorbent component.

Further, reducing the amount of $NH_3$ to be accumulated in the regenerator 14 can reduce an input heat quantity (thermal load of the column bottom reboiler and column top condenser) required to evaporate and condense $NH_3$.

An acid gas removal method according to the present embodiment includes: a $CO_2$ absorption process of introducing the gas 11 containing the corrosive substance ($NH_3$) and the $C_2$, which is acid gas, into the absorber 13 and bringing the $CO_2$ contained in the gas 11 into contact with the $CO_2$ absorbent 12 to remove the $CO_2$; an absorbent regeneration process of introducing the rich solution 12A containing the $CO_2$ absorbed therein into the regenerator 14 and regenerating the $CO_2$ using vapor from the reboiler; a process of circulating and reusing the $CO_2$ absorbent 12 using a circulation line between the absorber 13 and the regenerator 14; a regenerator condensation process of condensing moisture from the entraining gas 41 entraining the $CO_2$ and the corrosive substance ($NH_3$) that have been separated, the regenerator condensation process being performed outside the regenerator 14 at the absorbent regeneration process; a process of separating the $CO_2$ gas 45 from the condensed water 44 obtained by cooling the entraining gas 41 to condense vapor; a process of refluxing and storing the condensed water 44 at a position closer to the column top portion 14c than the position of the rich solution introducing unit 14a into which the rich solution 12A is introduced in the regenerator 14; and a process of extracting the refluxed condensed water 44 and merging the lean solution 12B circulating to the absorber 13 and the condensed water 44 containing the corrosive substance.

According to the acid gas removal method according to the present embodiment, mixing the lean solution 12B to be supplied to the absorber 13 with the condensed water 44 to increase the $NH_3$ concentration of the corrosive substance in the lean solution 12B can reduce the amount of $NH_3$ to be newly absorbed from the untreated gas in the absorber 13, and reduce the amount of $NH_3$ in the untreated gas to be moved to the condensed water 44, thereby suppressing an increase in the concentration of $NH_3$ in the condensed water 44.

Second Embodiment

Figure 2:
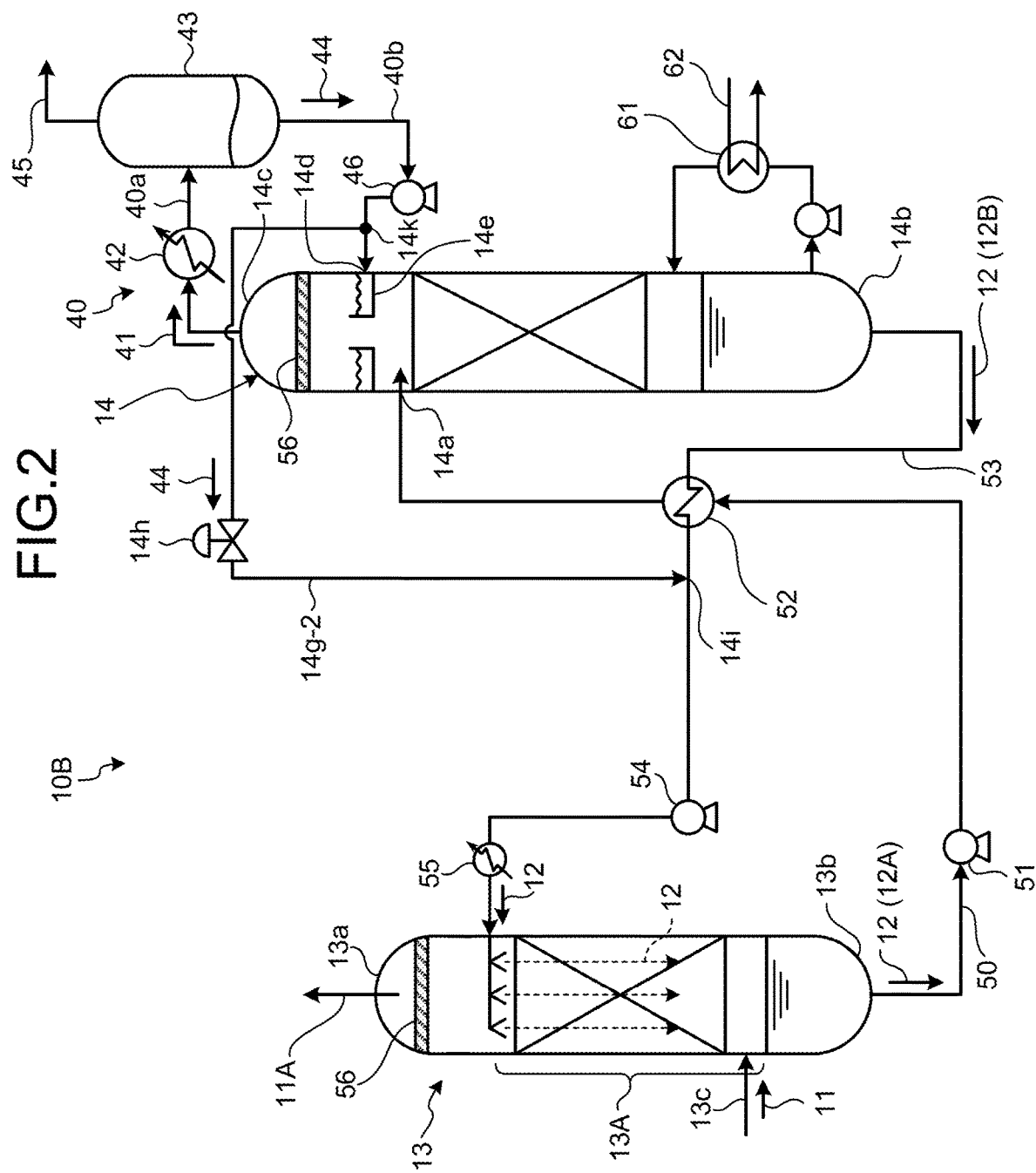
FIG. 2 is a schematic diagram of an acid gas removal device according to a second embodiment.

FIG. 2 is a schematic diagram of an acid gas removal device according to a second embodiment. The same configurations as those described in the first embodiment are indicated by the same reference signs as those described in the first embodiment, and the redundant description thereof is omitted. As illustrated in FIG. 2, an acid gas removal device 10B according to the present embodiment includes a second condensed water extraction line 14g-2 that extracts, from a branch portion 14k of the reflux line 40b, part of the condensed water 44 before the condensed water 44 is introduced to the condensed water introducing unit 14d, instead of the extraction of the condensed water 44 by the first condensed water extraction line 14g-1 described in the first embodiment. The second condensed water extraction line 14g-2 is connected to the lean solution supply line 53 between the rich/lean solution heat exchanger 52 and the absorber 13.

The branch portion 14k that causes branching of the condensed water 44 may be installed between the gas-liquid separator 43 and the reflux water circulation pump 46.

According to the acid gas removal method according to the present embodiment, mixing the lean solution 12B to be supplied to the absorber 13 with the condensed water 44 to increase the $NH_3$ concentration of the corrosive substance in the lean solution 12B can reduce the amount of $NH_3$ to be newly absorbed from the untreated gas in the absorber 13, and reduce the amount of $NH_3$ in the untreated gas to be moved to the condensed water 44, thereby suppressing an increase in the concentration of $NH_3$ in the condensed water 44.

Third Embodiment

Figure 3:
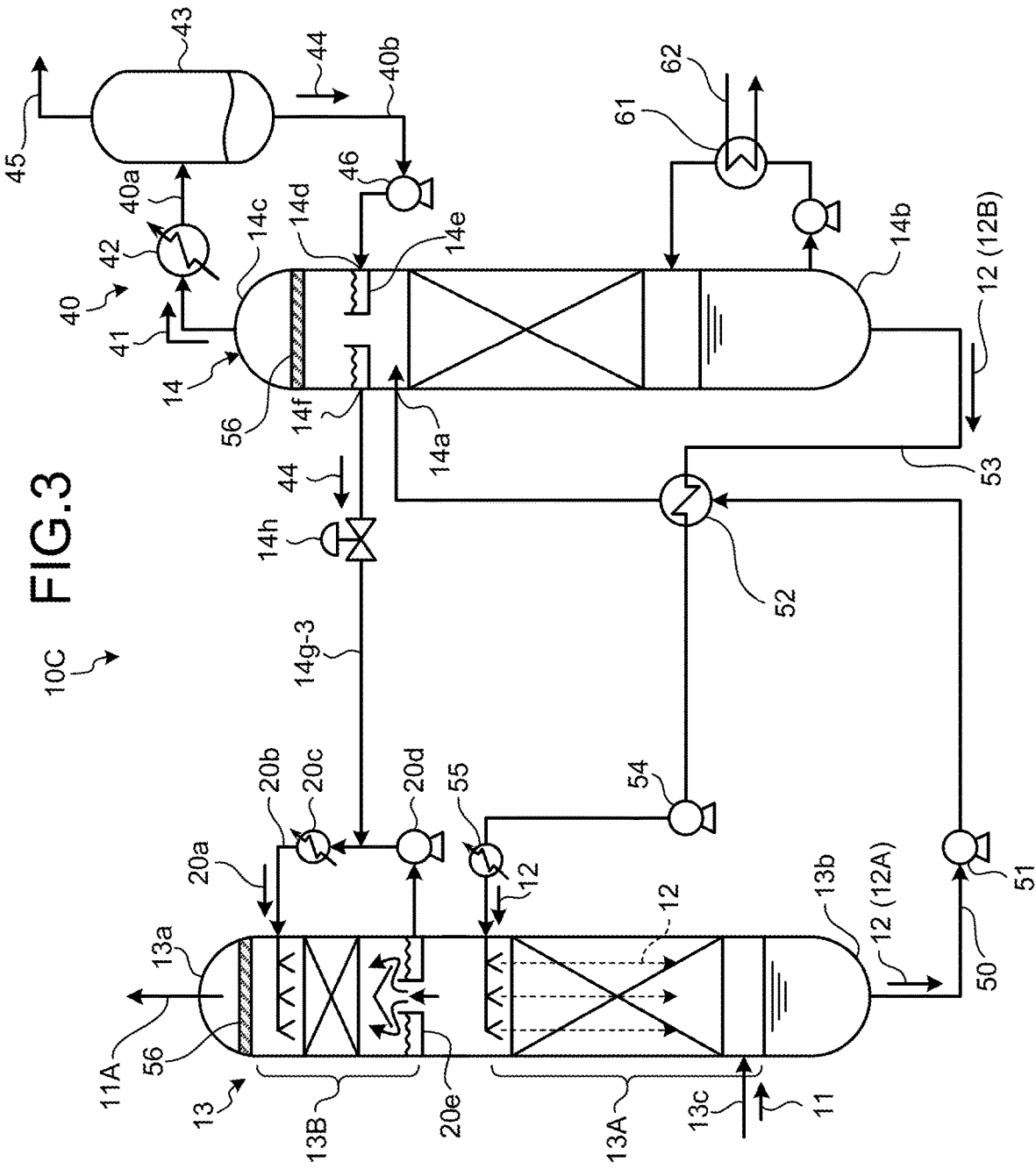
FIG. 3 is a schematic diagram of an acid gas removal device according to a third embodiment.

FIG. 3 is a schematic diagram of an acid gas removal device according to a third embodiment. The same configurations as those described in the first embodiment are indicated by the same reference signs as those described in the first embodiment, and the redundant description thereof is omitted. As illustrated in FIG. 3, an acid gas removal device 10C according to the present embodiment includes a cleaning unit 13B installed on the downstream side of the $CO_2$ absorbing unit 13A in a gas flow direction in the absorber 13 described in the first embodiment. The cleaning unit 13B cleans gas from which $CO_2$ has been removed by circulating wash water 20a.

In the present embodiment, the circulating wash water 20a containing the $CO_2$ absorbent supplied from a nozzle is in contact with the gas in the cleaning unit 13B of the absorber 13, and the $CO_2$ absorbent entrained by the gas from which $CO_2$ has been removed is recovered by the wash water 20a and released from the top portion to the outside of the system. A wash water circulation line 20b, a cooler 20c that cools the wash water 20a, a circulation pump 20d that circulates the wash water 20a, and a wash water storage unit 20e that stores the cleaning liquid are indicated by the respective reference signs.

In the present embodiment, a first condensed water extraction line 14g-3 is connected to the circulation line 20b for the wash water 20a to enable the merger of part of or all the condensed water 44.

According to the acid gas removal method according to the present embodiment, mixing the wash water 20a circulating through the cleaning unit 13B of the absorber 13 with the condensed water 44 to increase the $NH_3$ concentration of the corrosive substance contained in the wash water falling in the absorber can reduce the amount of $NH_3$ to be newly absorbed from the untreated gas in the absorber 13, and reduce the amount of $NH_3$ in the untreated gas to be moved to the condensed water 44, thereby suppressing an increase in the concentration of $NH_3$ in the condensed water 44.

Fourth Embodiment

Figure 4:
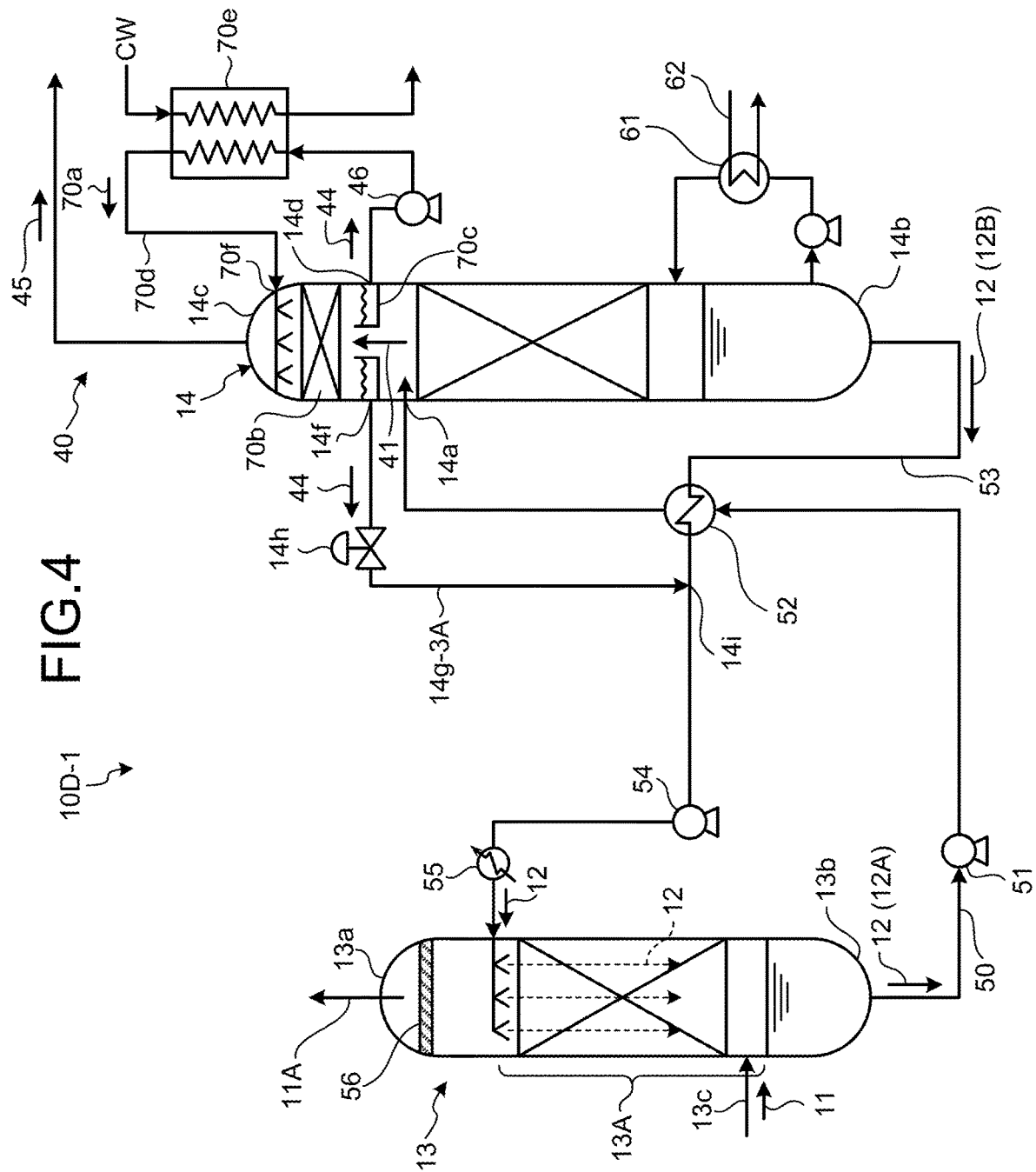
FIG. 4 is a schematic diagram of an acid gas removal device according to a fourth embodiment.
Figure 5:
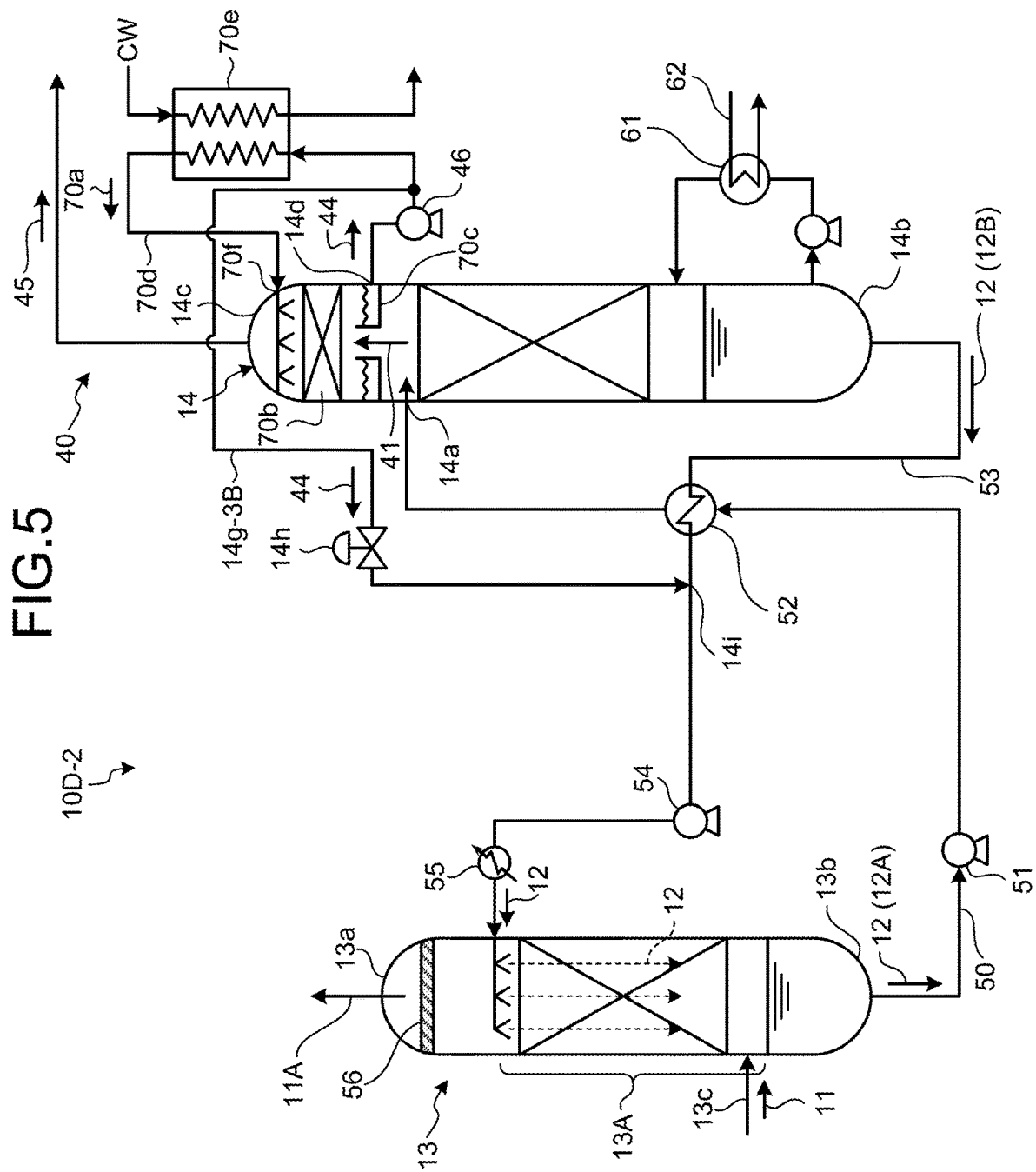
FIG. 5 is a schematic diagram of another acid gas removal device according to the fourth embodiment.

FIG. 4 is a schematic diagram of an acid gas removal device according to a fourth embodiment. FIGS. 5 and 6 are schematic diagrams of other acid gas removal devices according to the fourth embodiment. The same configurations as those described in the first embodiment are indicated by the same reference signs as those described in the first embodiment, and the redundant description thereof is omitted. As illustrated in FIG. 4, an acid gas removal device 10D-1 according to the present embodiment includes the regenerator condenser 40 that condenses moisture from the entraining gas 41 entrancing the corrosive substance and the acid gas and discharged from the column top portion 14c of the regenerator 14. The regenerator condenser 40 is installed closer to the column top portion 14c than the rich solution introducing unit 14a of the regenerator 14. The regenerator condenser 40 includes: a concentrating unit 70b that cools the entraining gas 41 using cooling water 70a in the regenerator 14 and performs gas-liquid separation to separate the condensed water 44 from the $CO_2$ gas 45; a condensed water receiver 70c that stores the condensed water 44; a circulation line 70d that extracts the condensed water 44 from the condensed water receiver 70c and causes the condensed water 44 to circulate to the top portion side of the regenerator 14 using the reflux water circulation pump 46; a cooler 70e that is interposed in the circulation line 70d and cools the condensed water 44 using external cooling water CW to obtain the cooling water 70a; and a third condensed water extraction line 14g-3A that extracts the condensed water 44 from the condensed water extractor 14f of the condensed water receiver 70c and that is connected to the lean solution supply line 53 between the rich/lean solution heat exchanger 52 and the absorber 13.

Further, as illustrated in FIG. 5, an acid gas removal device 10D-2 according to the present embodiment may include, instead of the third condensed water extraction line 14g-3A, a third condensed water extraction line 14g-3B that extracts the condensed water 44 from a section between the cooler 70e of the circulation line 70d and the reflux water circulation pump 46 and that is connected to the lean solution supply line 53 between the rich/lean solution heat exchanger 52 and the absorber 13.

Further, as illustrated in FIG. 6, an acid gas removal device 10D-3 according to the present embodiment may include, instead of the third condensed water extraction lines 14g-3A and 14g-3B, a fourth condensed water extraction line 14g-4 that extracts the cooling water 70a from a section between the cooler 70e of the circulation line 70d and the cooling water introducing unit 70f and that is connected to the lean solution supply line 53 between the rich/lean solution heat exchanger 52 and the absorber 13.

According to the present embodiment, the regenerator condenser 40 that condenses moisture from the entraining gas 41 entraining the corrosive substance ($NH_3$) and the $CO_2$ is installed closer to the column top portion 14c than the rich solution introducing unit 14a of the regenerator 14, and cools the entraining gas 41 using a large amount of the cooling water 70a to condense moisture and performs gas-liquid separation.

In the present embodiment, to increase the gas-liquid contact efficiency in the concentrating unit 70b at the column top portion 14c, the flow rate of the condensed water in a gas-liquid contact portion of the concentrating unit 70b is increased by circulating the condensed water 44 that has been collected by the condensed water receiver 70c through the circulation line 70d of the column top portion of the regenerator 14. Then, part of the condensed water 44 is extracted by the third condensed water extraction line 14g-3A or 14g-3B, or part of the cooling water 70a is extracted by the fourth condensed water extraction line 14g-4, and the extracted part is mixed with the lean solution 12B extracted from the bottom portion 14b of the regenerator 14.

The present embodiment can increase a quantity of water flow of the cooling water 70a in the concentrating unit 70b of the regenerator 14, thereby increasing the efficiency of the gas-liquid contact with the entraining gas 41. This can improve the recovery efficiency of the amine or absorbent component entrained by the $CO_2$ gas into the condensed water 44.

Further, since the third condensed water extraction line 14g-3A or 14g-3B or the fourth condensed water extraction line 14g-4 is installed, mixing the lean solution 12B to be supplied to the absorber 13 with the condensed water 44 (cooling water 70a) increases the $NH_3$ concentration of the corrosive substance in the lean solution 12B, thereby reducing the amount of $NH_3$ to be newly absorbed from the untreated gas in the absorber 13, and reducing the amount of $NH_3$ in the untreated gas to be moved to the condensed water 44. As a result, an increase in the concentration of $NH_3$ in the condensed water 44 can be suppressed.

The acid gas removal method according to the present embodiment includes: a $CO_2$ absorption process of introducing the gas 11 containing the corrosive substance ($NH_3$) and the $C_2$, which is acid gas, into the absorber 13 and bringing the $CO_2$ contained in the gas 11 into contact with the $CO_2$ absorbent 12 to remove the $CO_2$; an absorbent regeneration process of introducing the rich solution 12A containing the $CO_2$ absorbed therein into the absorbent regenerator and regenerating the $CO_2$ using vapor from the reboiler; a process of circulating and reusing the $CO_2$ absorbent using the circulation line between the absorber 13 and the regenerator 14; a regenerator condensation process of condensing moisture from the entraining gas 41 at a position closer to the column top portion than the position of the rich solution introducing unit 14a into which the rich solution 12 is introduced in the regenerator 14 at the absorbent regeneration process; a process of separating the $CO_2$ gas 45 from the condensed water 44 obtained by cooling the entraining gas 41 to condense vapor; a reflux process of extracting the condensed water 44 to drain the condensed water 44 to the outside, cooling the condensed water 44 to make cooling water, and refluxing the condensed water 44 from the column top portion 14c of the regenerator 14; and a process of extracting the condensed water 44 and circulating the lean solution 12B circulating to the absorber 13 and the condensed water 44 containing the corrosive substance.

According to the acid gas removal method according to the present embodiment, mixing the lean solution 12B to be supplied to the absorber 13 with the condensed water 44 to increase the $NH_3$ concentration of the corrosive substance in the lean solution 12B can reduce the amount of $NH_3$ to be newly absorbed from the untreated gas in the absorber 13, and reduce the amount of $NH_3$ in the untreated gas to be moved to the condensed water 44, thereby suppressing an increase in the concentration of $NH_3$ in the condensed water 44.

REFERENCE SIGNS LIST

10A to 10C, 10D-1 to 10D-3 Acid gas removal device
11 Introduction gas (gas)
12 $CO_2$ absorbent
12A Rich solution
12B Lean solution
13A $CO_2$ absorbing unit
13 $CO_2$ absorber
14 Absorbent regenerator
41 Entraining gas
42 Cooler
43 Gas-liquid separator
44 Regenerator condensed water
45 $CO_2$ gas
46 Reflux water circulation pump
50 Rich solution supply line
51 Rich solution supply pump
52 Rich/lean solution heat exchanger
53 Lean solution supply line

The invention claimed is:

1. An acid gas removal device comprising:
an acid gas absorber including an acid gas absorbing unit that brings acid gas contained in gas containing a corrosive substance and the acid gas into contact with acid gas absorbent to remove the acid gas;
an absorbent regenerator that regenerates, using vapor from a reboiler, rich solution having absorbed the acid gas;
a rich solution supply line that extracts the rich solution from the acid gas absorber, and that introduces the rich solution into a rich solution introducing unit installed on a column top portion side of the absorbent regenerator;
a lean solution supply line that extracts, from a bottom portion of the absorbent regenerator, lean solution having been regenerated by releasing the acid gas in the absorbent regenerator, that introduces the lean solution into the acid gas absorber, and that reuses the lean solution as the acid gas absorbent;
a rich/lean solution heat exchanger installed at an intersection of the rich solution supply line and the lean solution supply line; and
a regenerator condenser that condenses moisture from entraining gas entraining the corrosive substance and the acid gas and discharged from a column top portion of the absorbent regenerator, wherein
the regenerator condenser includes:
a gas discharge line that discharges the entraining gas from the column top portion of the absorbent regenerator;
a cooler interposed in the gas discharge line;
a gas-liquid separator that separates the acid gas from regenerator condensed water obtained by condensing vapor using the cooler;
a reflux line that refluxes the regenerator condensed water to a condensed water introducing unit installed closer to the column top portion than the rich solution introducing unit;
a condensed water receiver that stores the regenerator condensed water introduced by the reflux line; and
a first condensed water extraction line that extracts the regenerator condensed water from a condensed water extractor of the condensed water receiver, and that is connected to the lean solution supply line.

2. The acid gas removal device according to claim 1, further comprising:
a second condensed water extraction line that extracts part of the regenerator condensed water before the regenerator condensed water is introduced to the condensed water introducing unit, instead of the extraction of the regenerator condensed water by the first condensed water extraction line, and that is connected to the lean solution supply line.

3. The acid gas removal device according to claim 1, wherein
the acid gas absorber includes a cleaning unit that is installed downstream of the acid gas absorbing unit in a gas flow direction, and that cleans the gas, from which the acid gas has been removed, using circulating wash water, and
part of or all the regenerator condensed water merges with the wash water.

4. An acid gas removal device comprising:
an acid gas absorber including an acid gas absorbing unit that brings acid gas contained in gas containing a corrosive substance and the acid gas into contact with acid gas absorbent to remove the acid gas;
an absorbent regenerator that regenerates, using vapor from a reboiler, rich solution having absorbed the acid gas;
a rich solution supply line that extracts the rich solution from the acid gas absorber, and that introduces the rich solution into a rich solution introducing unit installed on a column top portion side of the absorbent regenerator;
a lean solution supply line that extracts, from a bottom portion of the absorbent regenerator, lean solution that has been regenerated by releasing the acid gas in the absorbent regenerator, and that introduces the lean solution into the acid gas absorber and reuses the lean solution as the acid gas absorbent;
a rich/lean solution heat exchanger installed at an intersection of the rich solution supply line and the lean solution supply line; and
a regenerator condenser that condenses moisture from entraining gas entraining the corrosive substance and the acid gas and discharged from a column top portion of the absorbent regenerator, wherein
the regenerator condenser includes:

a concentrating unit that is installed closer to the column top portion than the rich solution introducing unit of the absorbent regenerator, that cools the entraining gas using cooling water in the absorbent regenerator, and that performs gas-liquid separation to separate regenerator condensed water from the acid gas;

a condensed water receiver that stores the regenerator condensed water;

a circulation line that extracts the regenerator condensed water from the condensed water receiver, and that causes the regenerator condensed water to circulate to the column top portion side of the absorbent regenerator using a reflux water circulation pump;

a cooler that is interposed in the circulation line, and that cools the regenerator condensed water to make cooling water; and a third condensed water extraction line that extracts the regenerator condensed water from a condensed water extractor of the condensed water receiver or from a section between the cooler of the circulation line and the reflux water circulation pump, and that is connected to the lean solution supply line.

5. The acid gas removal device according to claim 4, further comprising:

a fourth condensed water extraction line that extracts part of the cooling water, instead of the extraction of the regenerator condensed water by the third condensed water extraction line, and that is connected to the lean solution supply line.

6. An acid gas removal method comprising:

an acid gas absorption process of introducing gas containing a corrosive substance and acid gas into an acid gas absorber and bringing the acid gas contained in the gas into contact with acid gas absorbent to remove the acid gas;

an absorbent regeneration process of introducing rich solution having absorbed the acid gas into an absorbent regenerator and regenerating the acid gas absorbent using vapor from a reboiler;

a process of circulating and reusing the acid gas absorbent using a circulation line between the acid gas absorber and the absorbent regenerator;

a regenerator condensation process of condensing moisture from entraining gas entraining the corrosive substance and the acid gas that have been separated, the regenerator condensation process being performed outside the absorbent regenerator at the absorbent regeneration process;

a process of separating the acid gas from regenerator condensed water obtained by cooling the entraining gas to condense vapor;

a reflux process of refluxing and storing the regenerator condensed water at a position closer to a column top portion than a position where the rich solution is introduced into the absorbent regenerator; and a merger process of extracting the refluxed regenerator condensed water and merging the lean solution circulating to the acid gas absorber and the regenerator condensed water containing the corrosive substance.

7. The acid gas removal method according to claim 6, further comprising:

a cleaning process of cleaning the gas from which the acid gas has been removed, using circulating wash water, the cleaning process being performed downstream of the acid gas absorbing unit in a gas flow direction by the acid gas absorber, wherein part of or all the regenerator condensed water merges with the wash water.

8. An acid gas removal method comprising:

an acid gas absorption process of introducing gas containing a corrosive substance and acid gas into an acid gas absorber and bringing the acid gas contained in the gas into contact with acid gas absorbent to remove the acid gas;

an absorbent regeneration process of introducing rich solution having absorbed the acid gas into an absorbent regenerator and regenerating the acid gas absorbent using vapor from a reboiler;

a process of circulating and reusing the acid gas absorbent using a circulation line between the acid gas absorber and the absorbent regenerator;

a regenerator condensation process of condensing moisture from entraining gas entraining the corrosive substance with vapor and the acid gas at a position closer to a column top portion than a position where the rich solution is introduced into the absorbent regenerator at the absorbent regeneration process;

a process of separating the acid gas from regenerator condensed water obtained by cooling the entraining gas to condense vapor in the absorbent regenerator;

a reflux process of extracting the regenerator condensed water to drain the regenerator condensed water to the outside, cooling the regenerator condensed water to make cooling water, and refluxing the regenerator condensed water from a column top portion side of the absorbent regenerator; and a process of extracting the regenerator condensed water and merging the lean solution circulating to the absorber and the condensed water containing the corrosive substance.

9. The acid gas removal method according to claim 8, further comprising:

a cleaning process of cleaning the gas from which the acid gas has been removed, using circulating wash water, the cleaning process being performed downstream of the acid gas absorbing unit in a gas flow direction by the acid gas absorber, wherein part of or all the regenerator condensed water merges with the wash water.

* * * * *